No. 867,044.
PATENTED SEPT. 24, 1907.
P. HUSS.
LARDING NEEDLE FOR MEAT.
APPLICATION FILED MAY 29, 1907.
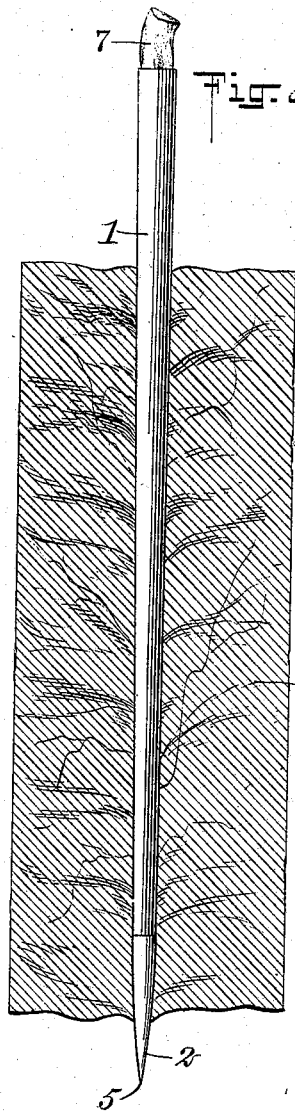
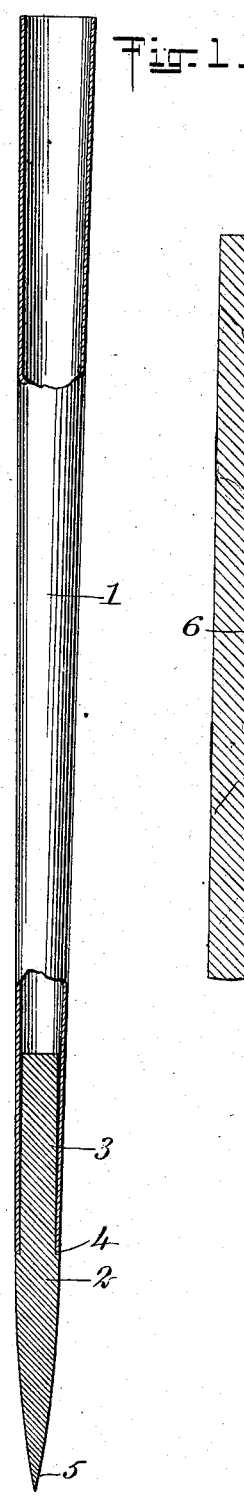
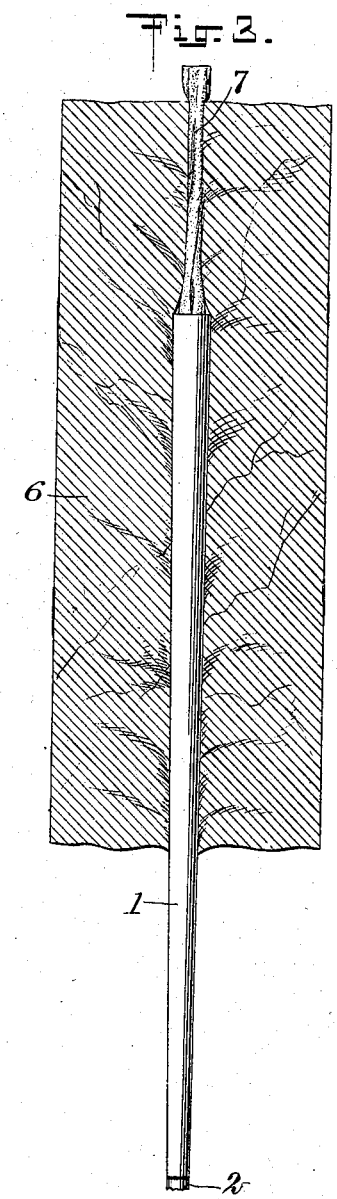
WITNESSES
INVENTOR
Philip Huss
BY
ATTORNEYS

UNITED STATES PATENT OFFICE.

PHILIP HUSS, OF LAKEWOOD, NEW JERSEY.

LARDING-NEEDLE FOR MEAT.

No. 867,044.      Specification of Letters Patent.      Patented Sept. 24, 1907.

Application filed May 29, 1907. Serial No. 376,255.

*To all whom it may concern:*

Be it known that I, PHILIP HUSS, a citizen of the United States, and a resident of Lakewood, in the county of Ocean and State of New Jersey, have invented a new and Improved Larding-Needle for Meat, of which the following is a full, clear, and exact description.

This invention relates to a larding needle for facilitating the larding of meat before cooking.

The object of the invention is to produce a device of simple construction, which can be operated quickly to lard the meat, and which will be cleanly and sanitary.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a side elevation of the needle, the upper and lower portions thereof being shown in cross section; Fig. 2 is a side elevation of the device and illustrating the first stage of the larding process; and Fig. 3 is a view similar to Fig. 2, the lower portion of the needle being broken away; this view illustrates the larding process at a later stage.

Referring more particularly to the parts, 1 represents the body of the needle, which is of tubular form and slightly tapered as shown. The upper end of this body 1 is open and the lower end is normally closed by a removable tip 2, which tip has a reduced neck 3 received in the forward part of the body, and presenting an annular shoulder 4 against which the end of the body 1 seats. This tip 2 is formed with a sharp point 5 which is adapted to be thrust into the meat 6 in the manner indicated in Fig. 2.

When the needle is to be used for larding the meat, a sliver or strip 7 of fat is cut and placed in the interior of the tubular body 1, the upper portion of the strip being allowed to protrude from the butt end of the needle, as indicated in Fig. 2. The needle is then forced through the body of the meat in the manner indicated in Fig. 3. As the butt of the needle passes into the interior of the meat, the protruding end of the strip 7 at the rear is held by the pressure of the meat, which tends to close the opening formed by the passing of the needle. In this way the lard strip is held in the body of the meat and withdraws itself from the body of the needle as the needle is drawn downwardly through the meat. In this way the meat may be very quickly and effectively larded.

The tip 2 is removable so as to enable it to be cleaned and so as to enable the tubular body 1 to be cleaned likewise.

The larding strip is pushed into the needle from the butt end. If difficulty is met in introducing the larding strip as suggested, a small wire or stick may be used to assist the operation.

Having thus described my invention, I claim as new and desire to secure by Letters Patent:

A larding needle having a tapered tubular body to receive a larding strip, and a removable tapered tip constituting a plug for the forward end of said body, the butt end of said body being open whereby the end of the larding strip may project and be withdrawn when the needle is forced through the body of meat.

In testimony whereof I have signed my name to this specification in the presence of two subscribing witnesses.

PHILIP HUSS.

Witnesses:
CHARLES A. HALL,
WALTER C. O'LEARY.